United States Patent [19]
Raya

[11] Patent Number: 5,979,775
[45] Date of Patent: Nov. 9, 1999

[54] BATHING WATER PRE-MIXING SYSTEM

[76] Inventor: Richard Raya, 713 E. Azalea Dr., Montebello, Calif. 90640

[21] Appl. No.: 09/012,662

[22] Filed: Jan. 23, 1998

[51] Int. Cl.[6] .................................................. G05D 23/13
[52] U.S. Cl. ...................................... 236/12.12; 137/606
[58] Field of Search .............................. 236/12.12, 12.15; 137/597, 606

[56] References Cited

U.S. PATENT DOCUMENTS

| | | | |
|---|---|---|---|
| 1,153,547 | 9/1915 | Finney | 236/12.15 |
| 1,532,543 | 4/1925 | Newcomb | 236/12.12 |
| 2,828,766 | 4/1958 | Postmus | 137/606 |
| 4,558,817 | 12/1985 | Kiendl | 236/12.12 |

Primary Examiner—William E. Tapolcai
Attorney, Agent, or Firm—Goldstein & Canino

[57] ABSTRACT

A bathing water pre-mix system, for attaching to an existing plumbing system and supplying temperature regulated water to a user. A mixing tank has a hot water inlet and cold water inlet that is attached to the existing plumbing system. The mixing tank has at least one outlet for dispensing water from the mixing tank, preferably through a shower head. A desired temperature control allows the user to set a desired water temperature. A pair of solenoid valves control water flow at the hot water inlet and cold water inlet in an attempt at achieving the desired water temperature within the mixing tank. A water level indicator informs the user about the water level within the mixing tank. When a sufficient volume of water is present in the mixing tank at the desired temperature, water flow into the tank is halted, and the water in the mixing tank is dispensed to the user through the outlet. The mixing tank and outlet may be configured so that the mixing tank is not normally fully depleted, but leaves a reserve supply which may be accessed in the event of an emergency.

6 Claims, 3 Drawing Sheets

BATHING WATER PRE-MIXING SYSTEM

BACKGROUND OF THE INVENTION

The invention relates to a bathing water pre-mixing system. More particularly, the invention relates to a system for combining hot and cold water, and mixing the same to a desired water temperature desired by the user, before it is released to the user for bathing.

People have different preferrences with regard to the temperature of the water that they bathe in. Some people like the water dispensed from their shower head to be lukewarm. Others prefer to take a shower with very hot water. Whatever temperature is desired, it must be obtained by mixing cold water and scalding hot water.

Usually the mixing is done by adjusting the hot and cold water taps, until the desired temperature is achieved. Part of the mixing process always involves running the hot water tap until the water obtained therefrom is very hot. This involves allowing cooled down water sitting in the hot water pipes to run off, until only hot water fresh from the source is available at the tap. While the user waits for the water from the tap to become hot, and then experimentally adjusts the mix with the cold water to obtain the desired temperature, all water is wasted down the drain.

In addition to the wastefullness of the present system as described, it can also surprise the user with a sudden burst of hot or cold water, causing discomfort or injury. Before the hot water being dispensed is obtained directly from the hot water source, it can oscillate between hot and warm. Thus, one might believe that the hottest water is currently being dispensed and adjust the temperature accordingly, only to be surprised moments later when the hot water suddenly reaches its true maximum temperature. In addition, in some low pressure plumbing systems, a toilet flush or any other use of cold water in the household can confront the shower user with a suddenly stream of scalding hot water.

Further, conventional plumbing systems generally have no provisions for storing water for an emergency. In the event of an emergency such as an earthquake or fire, it is quite likely that the water supply will be interrupted. When the water supply is suddenly interrupted, very little water can be obtained from the household plumbing before the lack of pressure prevents further water retrieval.

In addition, it has been discovered that high pressure water from a standard showerhead can help hair loss progress. The high pressure water can irritate the scalp. In addition, the water leaving the showerhead is not always uniformly mixed. Thus, Alternately hot and cold water droplets leaving a standard showerhead can damage the scalp.

U.S. Pat. No. 5,358,177 to Cashmore discloses a fluid flow and temperature control apparatus, for supplying a liquid at a constant temperature. Cashmore employs computer controlled valves for regulating the output water temperature in real time. A mixing chamber is provided which does not store water, but which simply constitutes a place where the hot water and cold water pipes are joined. Cashmore does not prevent water waste, since the water must still be "run off" until the required temperature is obtained.

U.S. Pat. No. 4,854,499 to Neumann discloses a temperature sensitive shower diverter valve and method for diverting shower water. Neumann is aimed at preventing a sudden burst of hot water from reaching a person while showering. To accomplish the same, Neumann employs a diverter valve at the shower head which automatically diverts the water away from the user when a sudden change in temperature is detected. Neumann simply interrupts the shower spray when the water is too hot, it does not help achieve an optimum shower water temperature for the user.

U.S. Pat. No. 4,563,780 to Pollack describes an automated bathroom system. The system regulates water temperature and injects cleaning solutions and bath additives into the water stream. This system is wastefull, since it directs water to the drain if it is outside of a predetermined temperature range.

U.S. Pat. No. 4,554,688 to Puccerella discloses a water saving system which employs return lines, which return water to the water heater when the water in the pipes falls below a predetermined temperature. This system requires a complex network of pipes to operate, and cannot be easily installed in a conventional plumbing system simply having a hot water and cold water supply.

While these units may be suitable for the particular purpose employed, or for general use, they would not be as suitable for the purposes of the present invention as disclosed hereafter.

SUMMARY OF THE INVENTION

It is an object of the invention to produce a bath water pre-mixing system which dispenses water at a user selected water temperature.

It is another object of the invention to provide a bath water pre-mixing system which is connected to hot and cold water supplies, and mixes water from both of said supplies in a controlled manner before it is dispensed to the user.

It is a further object of the invention that the premixing system eliminates water waste, by employing a mixing tank, wherein water from the hot and cold supplies are mixed until the user selected water temperature is obtained, and then it is dispensed from the mixing tank to the user.

It is yet another object of the invention that the system minimizes the effects of hair loss that might otherwise be attributed to standard shower heads that are directly connected to hot and cold water supplies.

It is a still further object that the invention has provisions for storing water for an emergency. The water thus stored in the mixing tank may be released to the user in the even of an emergency, independently of the pressure situation of supply plumbing.

The invention is a bathing water pre-mix system, for attaching to an existing plumbing system and supplying temperature regulated water to a user. A mixing tank has a hot water inlet and cold water inlet that is attached to the existing plumbing system. The mixing tank has at least one outlet for dispensing water from the mixing tank, preferably through a shower head. A desired temperature control allows the user to set a desired water temperature. A pair of solenoid valves control water flow at the hot water inlet and cold water inlet in an attempt at achieving the desired water temperature within the mixing tank. A water level indicator informs the user about the water level within the mixing tank. When a sufficient volume of water is present in the mixing tank at the desired temperature, water flow into the tank is halted, and the water in the mixing tank is dispensed to the user through the outlet. The mixing tank and outlet may be configured so that the mixing tank is not normally fully depleted, but leaves a reserve supply which may be accessed in the event of an emergency.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
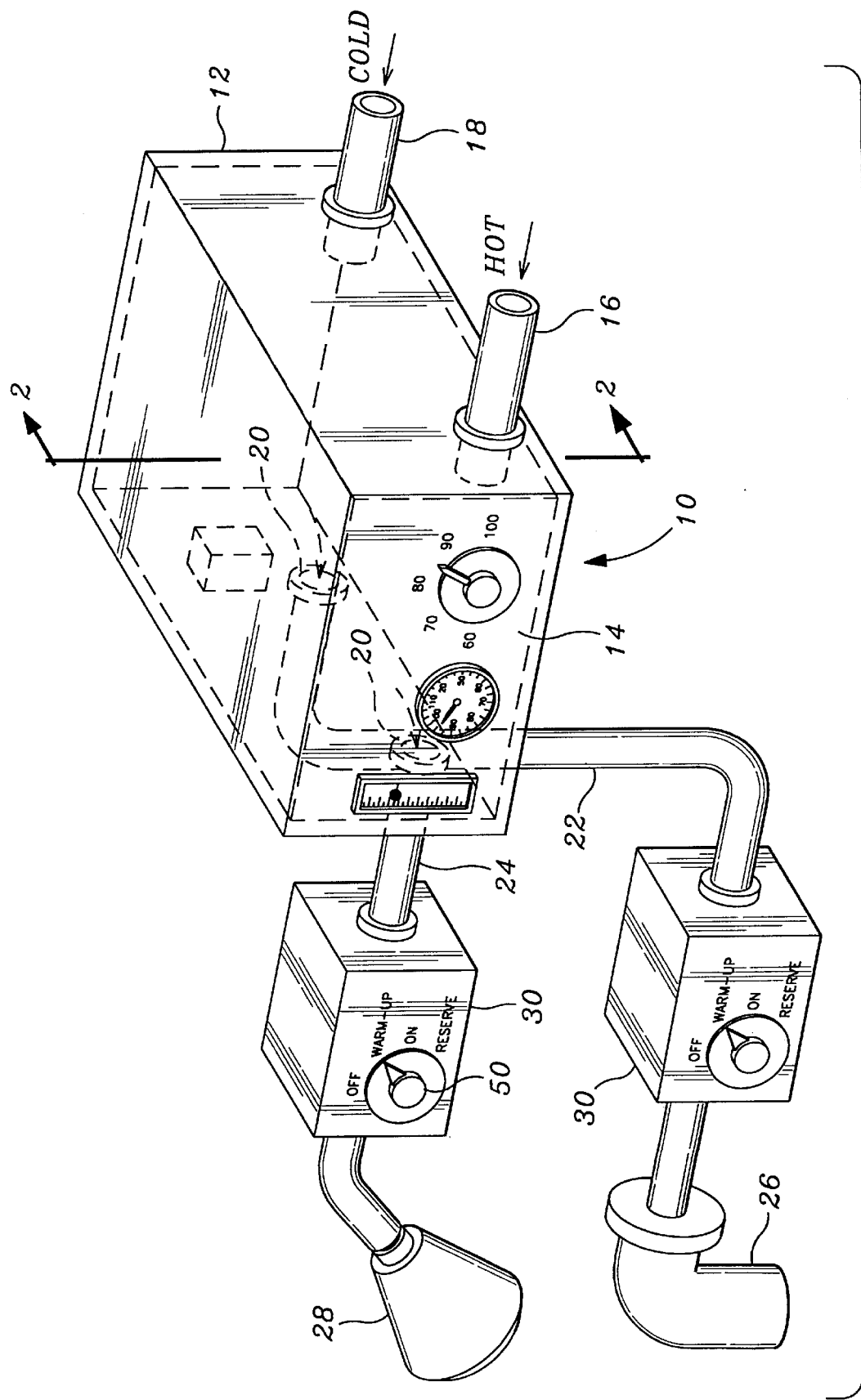
FIG. 1 is a diagrammatic perspective view, illustrating the invention.

FIG. 1 illustrates a bathing water mixing system 10 which is installed within any existing building structure, having an existing building plumbing system which includes a hot water supply and cold water supply. The bathing water mixing system 10 comprises a mixing tank 12 having a front panel 14. The mixing tank 12 has a hot water inlet 16 and a cold water inlet 18. The hot water inlet 16 and cold water inlet 18 are connected to the hot water supply and the cold water supply of the building plumbing system, respectively.

The mixing system 10 has at least one water outlet 20, which may include a bath tub outlet 22 and a shower head outlet 24. The bath tub outlet 22 has a bath tub spout 26, and the shower head outlet 24 has a shower head 28. At least one control box 30 may be mounted near the water outlets 20, adjacent to the bath tub spout 26 and/or the shower head 28. The mixing tank 12 must be mounted higher than the bath tub spout 26 or shower head 28, because the mixing system 10 relies on gravity to deliver water from the mixing tank 12.

Figure 2:
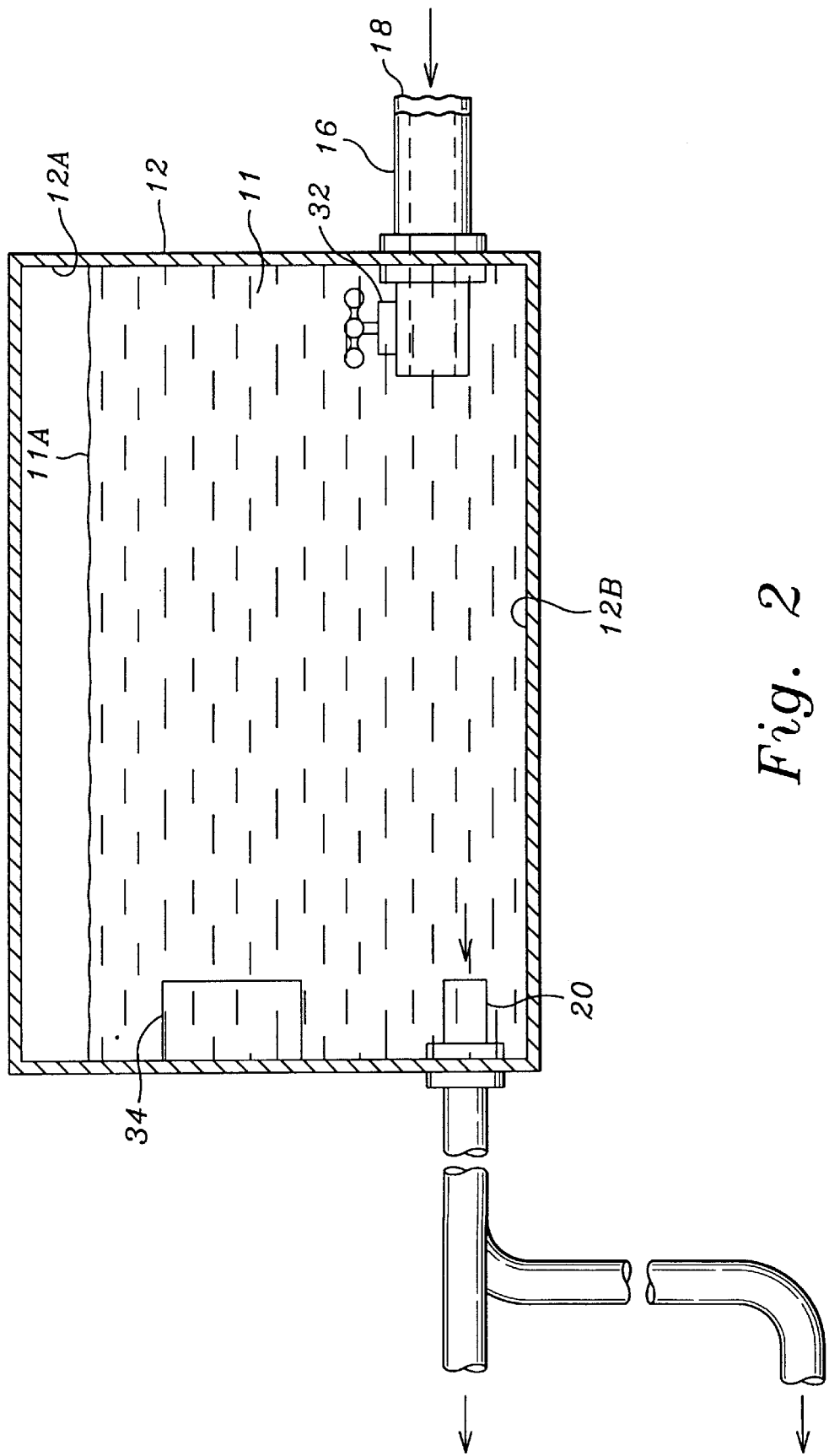
FIG. 2 is a cross sectional view, taken along line 2—2 in FIG. 1.

FIG. 2 illustrates the mixing tank 12 which defines a mixing tank interior 12A, having a tank bottom 12B. The mixing tank 12 contains a quantity of water 11, including a water level 11A. The mixing tank interior 12A is sized to hold several gallons of water. The precise size of the mixing tank may be varied, to serve the differing goals of the invention, and the differing preferences of the user. The hot and cold water inlets 16 and 18 are each selectively controllable with solenoid valves 32. The solenoid valves 32 are each capable of selectively stopping all flow through its respective inlet; allowing maximum flow through said inlet; or allowing flow at any level of flow less than maximum flow.

Also illustrated in FIG. 2 is a float 34 present within the mixing tank interior 12A. The float 34 helps determine the quantity of water within the mixing tank 12A by ascertaining the water level 11A. Water leaves the mixing tank through one of the water outlets 20. The water outlet 20 is preferably as close to the tank bottom 12B as possible, so that all water can be drained from the mixing tank 12.

According to an alternate embodiment, one of the water outlets may be located somewhat above the tank bottom 12B as shown in FIG. 2. An additional water outlet may be provided along the tank bottom 12B. Normally, water will drain from the mixing tank 12 until the water level 12A reaches the uppermost water outlet 20. Thus, a small reserve supply will remain in the mixing tank 12. In the event of an emergency, the additional water outlet will allow the reserve supply at the tank bottom 12B to be retrieved.

Figure 3:
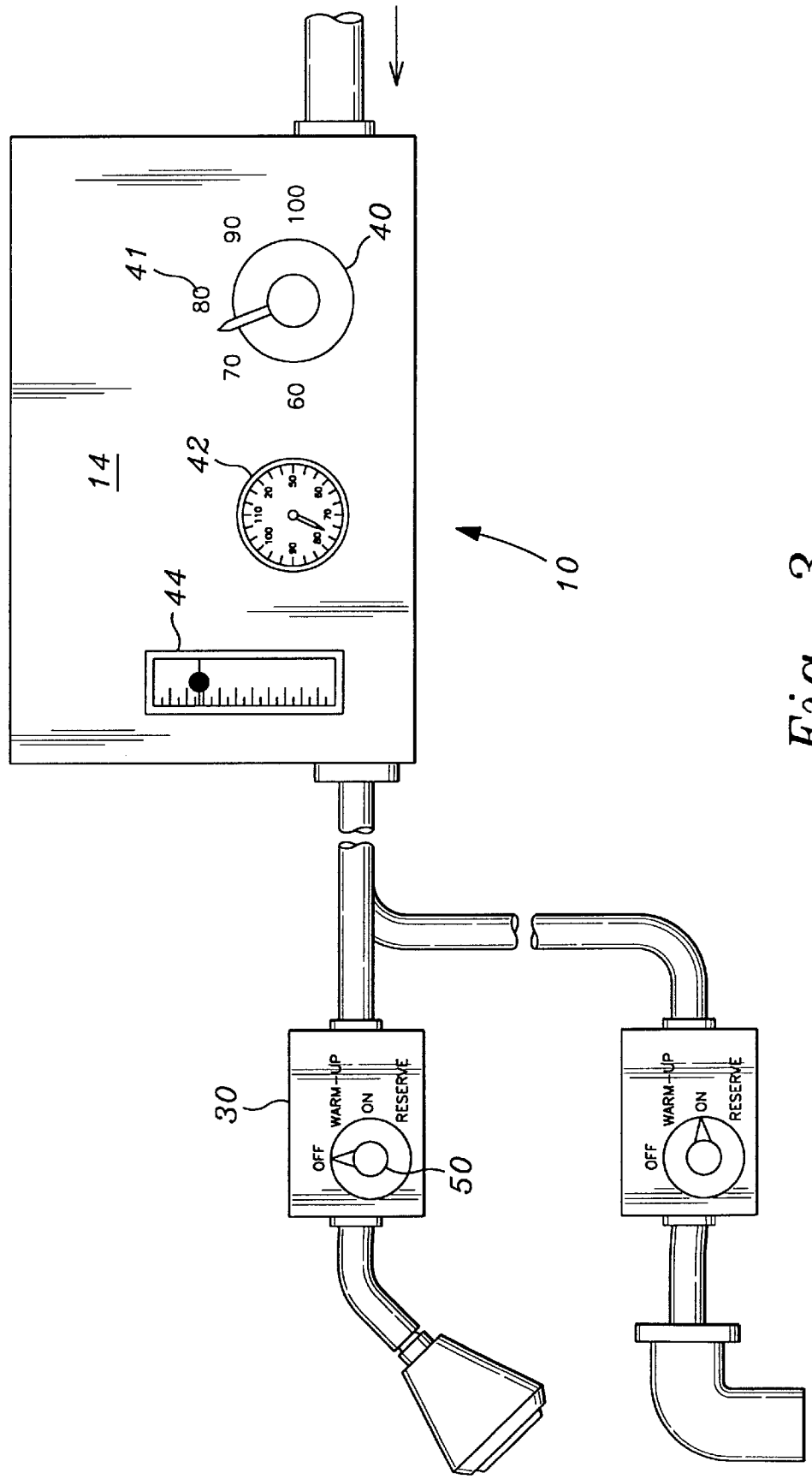
FIG. 3 is a front elevational view, illustrating the invention.

FIG. 3 illustrates the front panel 14. The front panel 14 includes a desired temperature setting control 40, an actual temperature indicator 42, and a water level indicator 44. The desired temperature setting control 40 may be a dial as illustrated, having temperature setting indicia 41 arranged around the control, or it may be any electrical, mechanical, or electromechanical means by which the user may set the desired temperature for the water. The actual temperature indicator 42 provides visual and/or audible indication of the actual temperature of the water within the mixing tank 12. The water level indicator 42 helps the user monitor the water level 11A within the mixing tank 12. The water level indicator 42 generally works in conjunction with the float 34 for determining and displaying the water level.

Also illustrated in FIG. 3, the control box 30 has a mode selector 50, which selects between various modes of operation for the mixing system 10. The preferred modes of operation are the warm-up mode, the on mode, the off mode, and the reserve mode.

Although many different modes of operation may be employed by the mixing system, following below is a brief description of the preferred modes of operation.

While in the warm-up mode, the solenoid valves 32 regulating the hot. water supply and cold water supply are opened, while the water outlets 20 are closed, allowing the mixing tank 12 to begin filling. The solenoid valves 32 selectively and separately control the hot water supply and cold water supply, according to the desired water temperature, and according to the actual water temperature. The solenoid valves 32 will adjust many times until an equillibrium situation is present, wherein the actual water temperature is substantially the same as the desired water temperature. Such repetitive adjustment need not be discussed in detail, because the same is the subject of numerous texts on control systems, such as CONTROL SYSTEMS by CHI-TSONG CHEN, SPAULDING PUBLICATIONS, and is well known by those skilled in the art. While in the warm up mode, the user can observe the water level rising by watching the water level indicator 44. Many users will prefer to allow the water level to rise until a level is reached which reflects the amount of water that the user knows they would normally use during a shower. If the float 34 indicates that the mixing tank 12 has filled to capacity, it automatically stops water flow through the hot water inlet and cold water inlet.

Once the desired warm up condition is reached, the user may select the on mode. Once the on mode is selected, water is allowed to flow from the mixing tank 12, through one of the water outlets 20. The user can then shower or bathe in water that is temperature regulated. While in the on mode, the water is slowly depleted from the mixing tank 12, as the solenoid valves 32 cut off water from entering the mixing tank 12 through the hot water inlet 16 and cold water inlet 18. The user continues their showering, until the water from the mixing tank is fully depleted.

While in the off mode, water does not enter the mixing tank 12 through the hot water inlet 16 band cold water inlet 18. Further, no water exits the mixing tank through the outlet 20.

The reserve mode works when the apparatus described herein is configured according to the alternate embodiment discussed above wherein one of the water outlets is positioned above the tank bottom 12B and an alternate water outlet is positioned at the tank bottom 12B. With such an apparatus, once the mixing tank 12 has partially filled, and then has been depleted with the off mode, reserve water will be stored below the uppermost water outlet. This water may be retrieved in the event of an emergency by entering the reserve mode. Once the reserve mode has been entered, water is allowed to flow from the alternate water outlet, releasing the reserve supply to the user.

According to a simplified, manual embodiment of the invention, the user may be given manual control of the valves 32 which regulate the flow of water through the hot water inlet 16 and cold water inlet 18. On front panel 14, the desired temperature control is omitted. When in warm-up mode the user can then monitor the actual temperature indicator 42 and the water level indicator 44 as the mixing tank 12 fills, and adjust the vavles 32 until the desired temperature and desired water level is achieved. The user can then deplete the mixing tank 12 by placing the mixing system 10 in the on mode, and shower with the water from the mixing tank as discussed in the previous embodiments.

In conclusion, herein is provided a water mixing system which allows a user to pre-mix water until it is temperature regulated, before actually bathing. The system described herein prevents water waste, allows one to take a shower that is less harmful to the body by providing homogeneous temperature regulated water, and may store water for release under emergency circumstances.

What is claimed is:

1. A water mixing system, for attaching to an existing plumbing system having hot water and cold water supplies, and providing temperature regulated water to a user, comprising:

a mixing tank, having a mixing tank bottom and a mixing tank interior capable of holding water, the mixing tank having a hot water inlet and a cold water inlet;

a pair of valves attached to the hot water inlet and cold water inlet for altering the water flow therefrom and adjusting the temperature of the water within the mixing tank;

and at least one outlet attached to the mixing tank that is attached to a device selected from a bath tub spout and shower head for dispensing the water to the users;

an actual temperature indicator, for indicating to the user the temperature of the water within the mixing tank; and a control means, for selectively allowing the mixing tank to fill with water while no water leaves the mixing tank through the outlet, and allowing the tank to empty through the outlet while no water enters the filling tank through the hot water inlet and cold water inlet.

2. The water mixing system as recited in claim 1, further comprising a desired temperature control, for allowing the user to set a desired water temperature, and wherein the valves are solenoid valves which automatically adjust flow through the hot water inlet and cold water inlet to achieve the desired water temperature within the mixing tank.

3. The water mixing system as recited in claim 2, wherein the mixing tank further has a water level when there is water inside the mixing tank, and wherein the water mixing system further comprises a water level indicator, for indicating the water level to the user.

4. The water mixing system as recited in claim 3, wherein the water outlet includes an uppermost water outlet which is above the mixing tank bottom, so that said uppermost water outlet allows a reserve supply to collect in the mixing tank which cannot be drained by the uppermost water outlet.

5. The water mixing system as recited in claim 4, wherein the water outlet includes an additional water outlet which is located at the mixing tank bottom that is capable of draining the reserve supply from the mixing tank, and wherein the control means further allows selection of a reserve mode wherein when the reserve mode is selected the additional water outlet is enabled for draining the reserve supply from the mixing tank.

6. A water mixing method for providing temperature regulated bathing water to a user, using a mixing tank having a cold water inlet and a hot water inlet that is attached to an existing plumbing system, and having valves including solenoid valves for controlling water flow into the hot water inlet and cold water inlet, the mixing tank having an outlet comprising a shower head for supplying temperature regulated water from the mixing tank, the mixing tank also having a desired temperature control, comprising the steps of:

setting a desired water temperature by the user with the desired temperature control;

filling the mixing tank with water while:
   monitoring the temperature of the water and adjusting the valves to regulate the temperature of the water by controlling the solenoid valves according to the temperature of the water in accorance with and in an attempt at having the water temperature achieve the desired water temperature;

dispensing the water from the mixing tank through the outlet while interrupting water flow through the hot water inlet and cold water inlet; and bathing with the water from the outlet.

\* \* \* \* \*